(12) United States Patent
Zito et al.

(10) Patent No.: US 8,358,966 B2
(45) Date of Patent: *Jan. 22, 2013

(54) DETECTING AND MEASURING EXPOSURE TO MEDIA CONTENT ITEMS

(75) Inventors: Tom Zito, Sausalito, CA (US); Mark D. Klein, Los Altos, CA (US); Allan E. Alcorn, Portola Valley, CA (US); Gary S. Fletcher, Jr., Auburn, CA (US)

(73) Assignee: Astro West LLC, Columbia, MD (US)

( * ) Notice: Subject to any disclaimer, the term of this patent is extended or adjusted under 35 U.S.C. 154(b) by 439 days.

This patent is subject to a terminal disclaimer.

(21) Appl. No.: 12/576,184

(22) Filed: Oct. 8, 2009

(65) Prior Publication Data

US 2010/0257052 A1    Oct. 7, 2010

Related U.S. Application Data

(63) Continuation of application No. 11/216,543, filed on Aug. 30, 2005, now Pat. No. 7,623,823.

(60) Provisional application No. 60/606,229, filed on Aug. 31, 2004, provisional application No. 60/655,305, filed on Feb. 22, 2005.

(51) Int. Cl.
*H04H 60/33* (2008.01)

(52) U.S. Cl. .............. 455/2.01; 725/9; 725/19

(58) Field of Classification Search .............. None
See application file for complete search history.

(56) References Cited

U.S. PATENT DOCUMENTS

| | | | |
|---|---|---|---|
| 4,025,851 A | 5/1977 | Haselwood et al. | |
| 4,697,209 A | 9/1987 | Kiewit et al. | |
| 5,481,294 A | 1/1996 | Thomas et al. | |
| 5,574,962 A | 11/1996 | Fardeau et al. | |
| 5,581,800 A | 12/1996 | Fardeau et al. | |
| 5,594,934 A | 1/1997 | Lu et al. | |
| 5,675,510 A | 10/1997 | Coffey et al. | |
| 5,764,763 A | 6/1998 | Jensen et al. | |
| 5,768,680 A | 6/1998 | Thomas | |
| 6,115,680 A | 9/2000 | Coffee et al. | |
| 6,574,594 B2 | 6/2003 | Pitman et al. | |
| 6,633,651 B1 | 10/2003 | Hirzalla et al. | |
| 6,754,470 B2 | 6/2004 | Hendrickson | |
| 6,766,523 B2 | 7/2004 | Herley | |
| 6,970,131 B2 | 11/2005 | Percy et al. | |
| 6,990,453 B2 | 1/2006 | Wang | |
| 6,993,245 B1 | 1/2006 | Harville | |
| 6,999,715 B2 | 2/2006 | Hayter et al. | |
| 7,031,921 B2 | 4/2006 | Pitman et al. | |
| 7,038,619 B2 | 5/2006 | Percy et al. | |

(Continued)

FOREIGN PATENT DOCUMENTS

| | | |
|---|---|---|
| WO | WO0079709 | 12/2000 |
| WO | WO03091990 | 11/2003 |

OTHER PUBLICATIONS

"Nielsen to Test Electronic Ratings Service for Outdoor Advertising," VNU Media Measurement & Information, Oct. 8, 2002, [online] [Retrieved on May 16, 2006] Retrieved from the Internet<URL:http://www.nielsenmedia.com/newsreleases/2002/Nielsen_Outdoor.htm>.

*Primary Examiner* — Philip Sobutka
(74) *Attorney, Agent, or Firm* — Barnes & Thornburg LLP; Peter Zura

(57) ABSTRACT

User exposure to media items is detected and measured. A mobile client device carried by a user digitally samples the audio environment of the user on a regular basis. These samples are transformed into a stream of data signatures and compared with reference media items to detect user exposure to the reference items. Purchase behavior following exposure to selected media content items can be detected and tracked as well, so as to gauge effectiveness of media items such as advertisements.

69 Claims, 4 Drawing Sheets

U.S. PATENT DOCUMENTS

| | | |
|---|---|---|
| 7,164,798 B2 | 1/2007 | Hua et al. |
| 7,194,752 B1 | 3/2007 | Kenyon et al. |
| 7,346,512 B2 | 3/2008 | Wang |
| 7,359,889 B2 | 4/2008 | Wang |
| 7,366,461 B1 | 4/2008 | Brown |
| 7,487,112 B2 | 2/2009 | Barnes |
| 7,623,823 B2 * | 11/2009 | Zito et al. .................. 455/2.01 |
| 2002/0032904 A1 | 3/2002 | Lerner |
| 2002/0078056 A1 | 6/2002 | Hunt et al. |
| 2002/0082837 A1 | 6/2002 | Pitman et al. |
| 2002/0168938 A1 | 11/2002 | Chang |
| 2003/0014747 A1 | 1/2003 | Spehr |
| 2003/0079015 A1 | 4/2003 | Fein et al. |
| 2003/0123850 A1 | 7/2003 | Jun et al. |
| 2003/0131350 A1 | 7/2003 | Peiffer et al. |
| 2004/0073916 A1 | 4/2004 | Petrovic et al. |
| 2004/0181799 A1 | 9/2004 | Lu et al. |
| 2004/0202348 A1 | 10/2004 | Kuzma |
| 2004/0226035 A1 | 11/2004 | Hauser |
| 2005/0021397 A1 | 1/2005 | Cui et al. |
| 2005/0044561 A1 | 2/2005 | McDonald |
| 2005/0065976 A1 | 3/2005 | Holm et al. |
| 2005/0066352 A1 | 3/2005 | Herley |
| 2005/0086682 A1 | 4/2005 | Burges et al. |
| 2005/0267750 A1 | 12/2005 | Steuer et al. |
| 2005/0289583 A1 | 12/2005 | Chiu |
| 2006/0122877 A1 | 6/2006 | Yazdani et al. |
| 2007/0006250 A1 | 1/2007 | Croy et al. |
| 2007/0107008 A1 | 5/2007 | Dybus |
| 2007/0124756 A1 | 5/2007 | Covell et al. |
| 2007/0124757 A1 | 5/2007 | Breen |
| 2007/0143777 A1 | 6/2007 | Wang |
| 2007/0157224 A1 | 7/2007 | Pouliot et al. |
| 2008/0215975 A1 | 9/2008 | Harrison et al. |
| 2009/0030780 A1 | 1/2009 | York et al. |

* cited by examiner

US 8,358,966 B2

DETECTING AND MEASURING EXPOSURE TO MEDIA CONTENT ITEMS

CROSS-REFERENCE TO RELATED APPLICATIONS

The present application claims priority as a continuation of U.S. Utility application Ser. No. 11/216,543, for "Detecting and Measuring Exposure to Media Content Items," filed Aug. 30, 2005, which claims priority from U.S. Provisional Patent Application Ser. No. 60/606,229, for "Measuring Media Consumption and Purchase Behavior Using Client-Device Audio Sampling, Client-Device Location Tracking, and Individual Purchase Information to Derive Marketing Effectiveness," filed Aug. 31, 2004 and which further claims priority from U.S. Provisional Patent Application Ser. No. 60/655,305, for "Personal Music Preference Determination Based on Listening Behavior," filed Feb. 22, 2005. The disclosures of U.S. Utility application Ser. No. 11/216,543, U.S. Provisional Patent Application Ser. No. 60/606,229, and U.S. Provisional Patent Application Ser. No. 60/655,305 are incorporated herein by reference.

FIELD OF THE INVENTION

The present invention relates generally to tracking of media consumption, and more particularly to detecting and measuring exposure to media items without requiring user action or knowledge.

BACKGROUND OF THE INVENTION

Producers and distributors of media content, as well as advertisers, are very interested in accurately measuring the size of their audiences. Such measurements ideally indicate the number of people that are exposed to, or that consume, the media content. There is also considerable interest in the demographics and other characteristics of media consumers.

Existing audience measurement techniques overlook many types of media consumption, consumer exposure to purchased music (on CD or mp3), video games, and movies. Initial sales data is available, but usage data is not. In other words, there may be information as to how many copies of a CD were purchased, but there is no information as to how often each consumer has listened to the CD (i.e., how often the consumer was exposed to the media item).

In addition, television viewing and radio listening are typically measured independently from each other and independently of other media consumption. Thus, there is no easy way to determine overall exposure to (consumption of) a particular content item such as an advertisement across various media, nor to obtain an overview of aggregate exposure to various media items and types of media items.

Another disadvantage of conventional media measurement techniques is that the effectiveness of advertising is typically measured in very broad terms. In particular, the effectiveness of advertising targeted at a particular demographic market segment is not easily determined, nor is it easy for advertisers to obtain quick feedback to confirm that their advertising has reached its intended target market.

Yet another disadvantage of conventional media measurement techniques is that such techniques are typically associated with the playback device (such as a particular television set, radio, or the like) and not directly associated with the consumer him- or herself (the viewer of the television set, listener to the radio, or the like). In addition, conventional measurement techniques do not provide a mechanism for tracking exposure both inside the home and outside the home (for example at a bar, or a friend's house, or the like).

Yet another disadvantage of conventional media measurement techniques is that they require active participation by the consumer and can often be quite burdensome. For example, in a "Nielsen family", users must interact with the measuring device (or fill out a paper diary) to identify which family members are watching the television at any given time. Such requirements result in inaccuracy, lowered and/or unreliable participation, skewed results, and the like.

Finally, existing media measurement techniques do not correlate user exposure to media items with store visits or purchases.

What is needed, therefore, is a media measurement technique that addresses the above-described limitations of the prior art.

What is further needed is a media measurement technique that reliably tracks user exposure to media content, regardless of how the content is delivered to the user. What is further needed is a technique that does so without unduly burdening the user and without requiring action on his part.

SUMMARY OF THE INVENTION

The system of the present invention detects and identifies user exposure to audible media. A mobile client device ("MCD") carried by a user digitally samples the audio environment of the consumer on a regular basis. These samples are transformed into a stream of data signatures and transmitted to a network operations center ("NOC").

At the NOC, the user's exposure to media content items is tracked and recorded, and can later be aggregated with information about other users so as to provide effective statistical reporting as to overall media exposure and consumption. The system can also record specific characteristics of the consumer of the circumstances of his or her exposure to the media content item. For example, the location at which the media was encountered, the activity the user was engaging in, and the like. Media exposure information can also be correlated with purchase information so as to make inferences as to the relationship between advertisements and purchasing behavior.

Using the recorded media exposure information and related tracking data, the present invention, in one embodiment, employs collaborative filtering or other cohort behavior analysis to identify fine-grained psychographic classifications of users and to measure the effectiveness of marketing on various groups. The resulting aggregated reports and interpretations facilitate better targeting of marketing resources so that they tend to reach users who have a high propensity to buy.

MCD 101 may be built into a consumer device with some other utility to the user; examples include a mobile phone, PDA, wristwatch, or the like. In alternative embodiments, MCD 101 can take any other form, such as a standalone device that is carried by or attached to the user. Embedding the functionality of the present invention in a device such as a mobile phone or wristwatch makes it more convenient for a user to carry MCD 101, and also encourages the user to keep MCD 101 in their possession at all times. MCD 101 operates passively and requires no user input.

BRIEF DESCRIPTION OF THE DRAWINGS

The accompanying drawings illustrate several embodiments of the invention and, together with the description, serve to explain the principles of the invention.

One skilled in the art will recognize that these Figures are merely examples of the operation of the invention according to one embodiment, and that other architectures and modes of operation can be used without departing from the essential characteristics of the invention.

DETAILED DESCRIPTION OF THE EMBODIMENTS

For purposes of the following description, the terms "user", "consumer", and "individual" are synonymous and are used interchangeably. The terms "consumption" and "exposure" are also synonymous and are used interchangeably.

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

Figure 1:
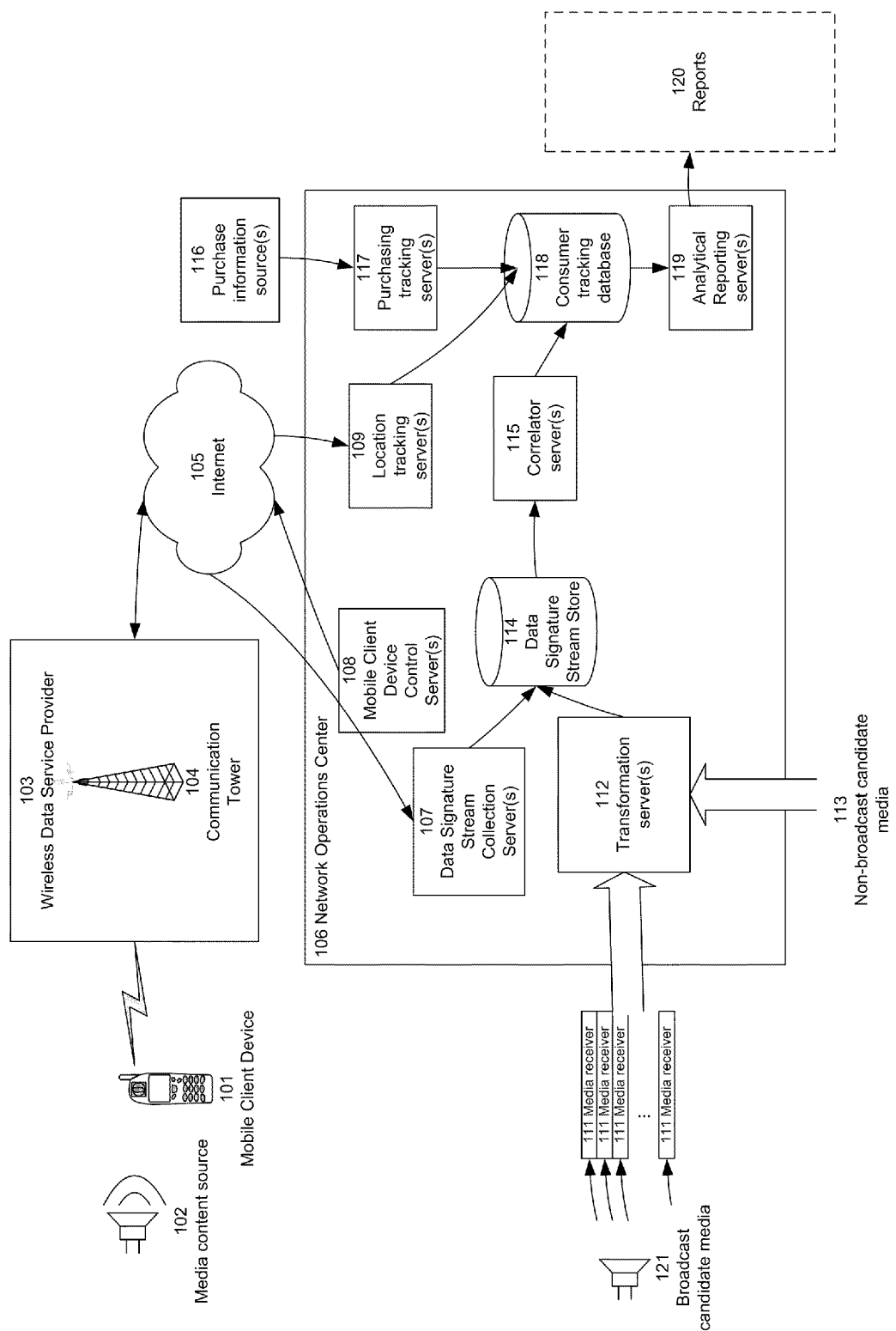
FIG. 1 is a block diagram depicting an overall architecture for implementing the present invention according to one embodiment.
Figure 3:
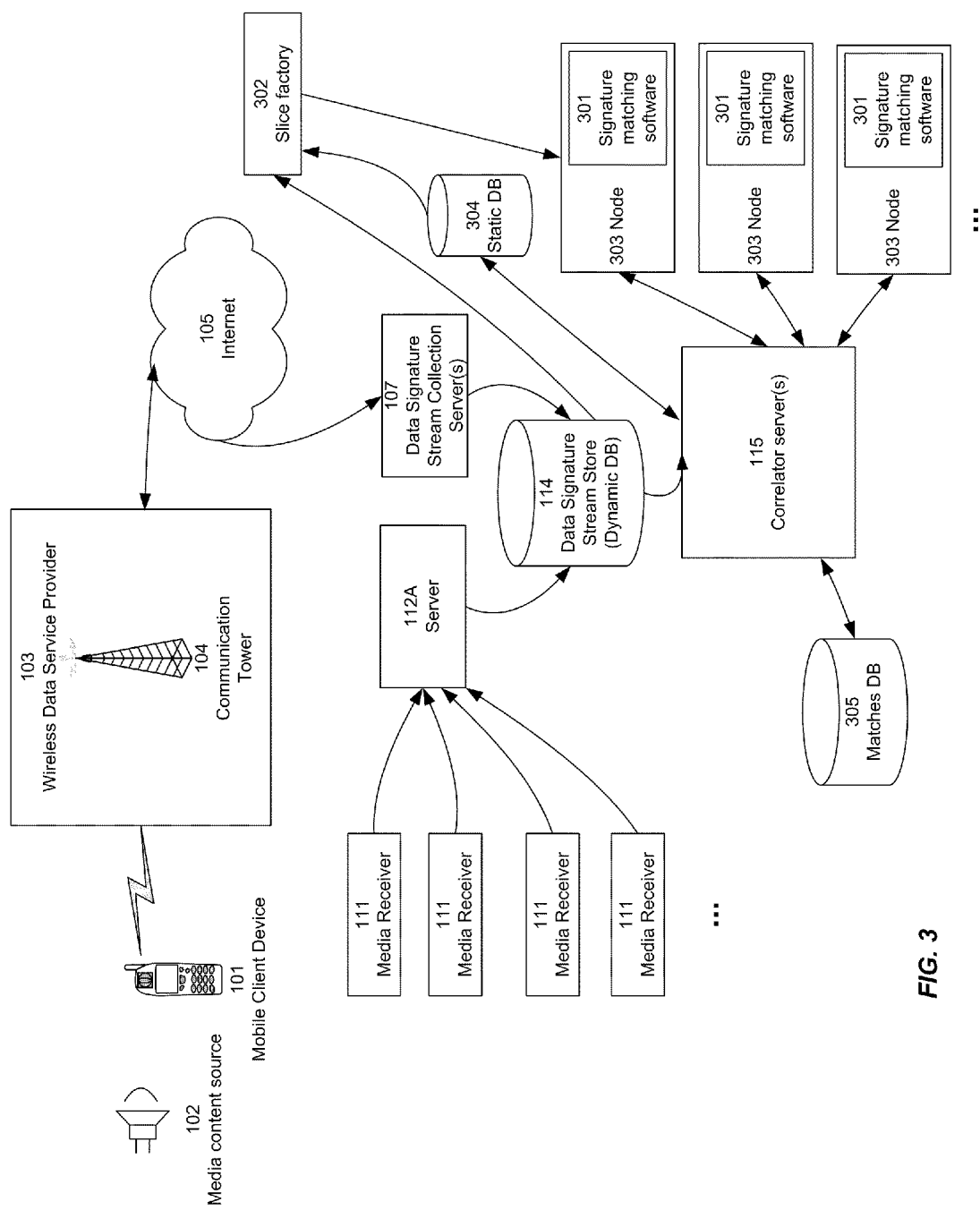
FIG. 3 is a block diagram depicting a conceptual architecture for implementing the present invention according to one embodiment.
Figure 4:
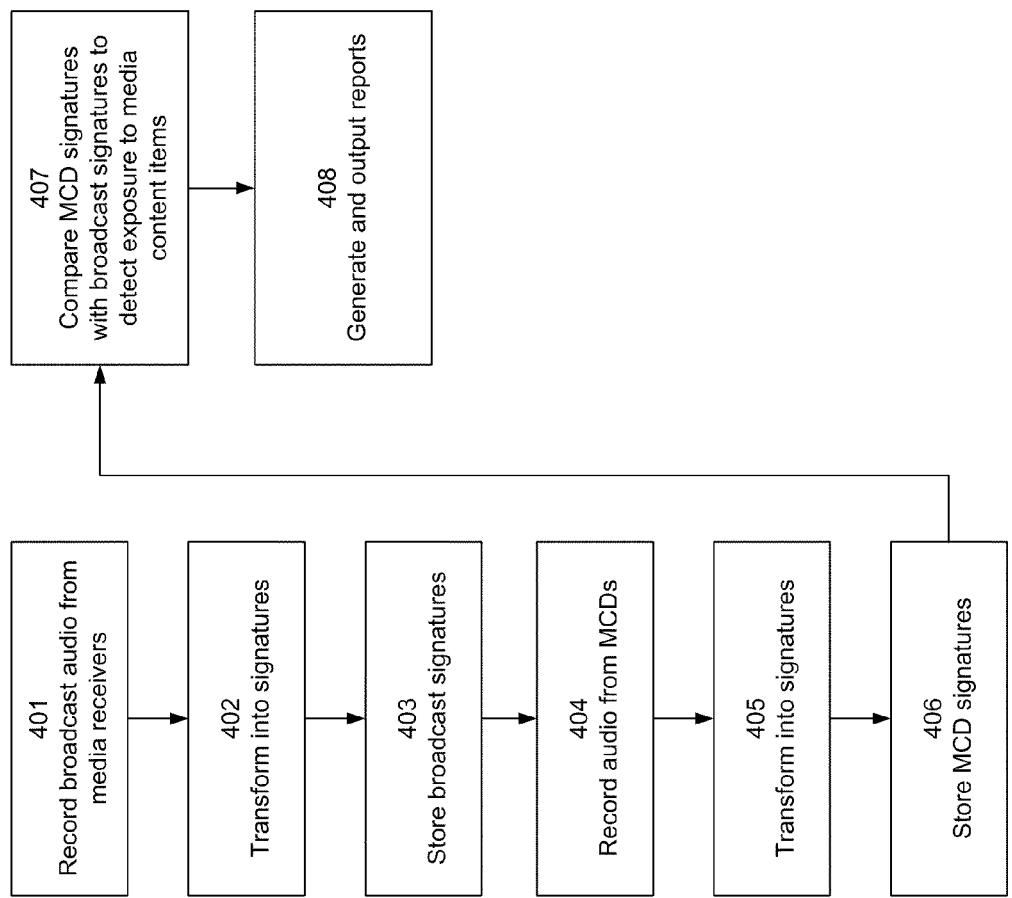
FIG. 4 is a flowchart depicting a method for practicing the present invention according to one embodiment.

Referring now to FIG. 1, there is shown a block diagram depicting an overall architecture for implementing the present invention according to one embodiment. Referring also to FIG. 3, there is shown a block diagram depicting a conceptual architecture for implementing the present invention according to one embodiment. Referring also to FIG. 4, there is shown a flowchart depicting a method for implementing the present invention according to one embodiment.

According to one embodiment of the present invention, media receivers 111 receive broadcast audio; this audio (or a sample of it) is recorded 401 and transformed into signatures 402. These signatures are stored 403 along with appropriate indexing mechanisms to facilitate retrieval and comparison. Mobile client devices 101 detect user exposure to media content sources 102, for example by picking up audio at a microphone of a cell phone. This audio is recorded 404 and transformed into signatures 405. These signatures are also stored 406. At a Network Operations Center (NOC) 106, the MCD signatures are compared 407 with signatures derived from the broadcast audio, so as to detect and identify media items to which the user has been exposed. In this manner, the present invention is able to determine, with great specificity, which media items a user has been exposed to, and the particulars of such exposure (including number of repetitions, location of exposure, correlation to buying behavior, and the like). GPS or other location data can also be used in analyzing the media exposure. From this correlation and analysis, reports are generated 408 and output. The present invention thus provides a mechanism for determining degrees of penetration and effectiveness for media content items such as advertisements. In addition, since users carry MCDs with them, the system of the present invention is able to detect exposure at any location, include within the home and outside the home.

Media content source 102 is any source to which a user may be exposed. Examples include television, radio, CDs, movies, public address announcements, and the like. According to the techniques described herein, the present invention tracks user exposure to various media content items that may come from any number of sources 102.

Mobile client device (MCD) 101 is a device capable of detecting and receiving audio from source 102. Any number of MCDs 101 can be provided; for example, in one embodiment each user being tracked has an MCD 101. In one embodiment, each MCD 101 is a device (or a component of a device) carried by a user (consumer). For example, MCD 101 may be built into a consumer device with some other utility to the user, such as a mobile phone, personal digital assistant (PDA), wristwatch, handheld computer, or the like. In one embodiment, MCD 101 includes a GPRS platform for transmitting data, and runs an operating system such as Microsoft Windows Mobile or J2ME. In alternative embodiments, MCD 101 can take any other form, such as a standalone device that is carried by or attached to the user. Embedding the functionality of the present invention in a device such as a mobile phone or wristwatch makes it more convenient for a user to carry MCD 101, and also encourages the user to keep MCD 101 in his or her possession at all times.

Although the description provided herein makes use of the term "MCD", it will be recognized by one skilled in the art that the detection devices need not be mobile; in other words, the present invention can be implemented using stationary devices that perform essentially the same function as described herein.

In one embodiment, MCD 101 makes use of already-present components (such as a microphone in a cell phone) to implement the operations described herein.

MCD 101 operates passively and requires no user input. In one embodiment, MCD 101 digitally samples the audio environment of the user on a regular basis; in another embodiment, MCD 101 performs such sampling when it detects that meaningful audio has been received at MCD 101. MCD 101 transforms the audio samples to a data signature stream that can be digitally transmitted and/or stored. The audio content items received by MCD 101 are referred to herein as target media items.

In one embodiment, signature transformation is performed at MCD 101. Since the signature transformation results in a compressed representation of the audio data, performing the transformation at MCD 101 reduces the quantity of data to be transmitted to NOC 106, thus reducing bandwidth requirements and system load.

For example, in one embodiment, the MCD 101 samples 10 seconds of audio data per 30 seconds received. Such a ratio is particularly effective for detecting exposure to commercials (advertisements), since many such commercials are 30 seconds long. MCD 101 creates a raw audio file (such as a .WAV file) from the sampled data, and performs a signature transformation to generate a signature file from the raw audio file. In one embodiment, the system of the present invention uses a signature transformation algorithm such as Shazam, described in Wang et al. and available from Shazam Entertainment Ltd., of London, England. This algorithm is also described in Avery Li-chun Wang, "An Industrial-Strength Audio Search Algorithm," October 2003, and Avery Li-Chun Wang and Julius O. Smith, III, WIPO publication WO0211123A3, 7 Feb. 2002, "Method for Search in an Audio Database." The signature transformation algorithm generates a 4 k file that is spooled (temporarily stored) at MCD 101. In one embodiment, MCD 101 erases the raw audio file once the signature file has been created; in another embodiment, raw audio is saved for some period of time for testing purposes.

In one embodiment, some information is lost during the transformation, so that the transformation is a one-way process; raw data cannot be reconstructed from the transformed data signature. Transmitting transformed data, as opposed to raw data, thus provides a measure of privacy and confidentiality.

Any of a number of signature algorithms can used. In one embodiment, the system of the present invention uses a signature transformation algorithm that meets design constraints of MCD 101 (processing power, battery life, available memory) and the transmission channel (bandwidth, availability, and the like). For example, the system may be configured to skip or postpone uploads if the network is unavailable. The transformation algorithm retains enough data to facilitate high-accuracy determinations of what media the user is listening to.

In one embodiment, MCD 101 places itself into a quiescent ("sleeping") state to lessen battery drain when the detected audio level drops below a threshold. During this sleeping state, MCD 101 periodically "wakes up" and determines if the audio level is sufficient to resume sampling.

In another embodiment, MCD 101 continually samples for N seconds every M seconds (such as 10 seconds every 30 seconds) and then processes the audio content to make a judgment via frequency analysis/power levels as to its useful audio content before passing it on to the audio fingerprint process. If the audio content is judged to be not sufficient relevant given current power levels, then the sample is discarded so as to save processing and transmission time and thus conserving battery usage.

In another embodiment, MCD 101 does not do any transforming; rather it merely sends raw data.

MCD 101 transmits data to data signature stream collection server(s) 107 at Network Operations Center (NOC) 106. In one embodiment, this transmission takes place via wireless data service provider 103 which operates communication towers 104 that receive signals from MCD 101 and relay the sampled audio data via the Internet 105 to one or more data signature stream collection servers 107 running at NOC 106. One skilled in the art will recognize that this data transmission can take place using any known wireless (or wired) communication method, and that such transmission can take place in real-time, or in a batched mode at periodic intervals, or in response to NOC 106 queries to MCD 101. In one embodiment, such transmission can take place via GPRS, TCP/IP, or other mechanisms, or any combination thereof. In one embodiment, the user "docks" or connects MCD 101 to a computer or other device (not shown) in order to transmit data to NOC 106.

In one embodiment, signature files are transmitted to data signature stream collection server(s) 107 on a periodic basis (for example, every five minutes). However, if a connection cannot be made, or if power at MCD 101 is low, transfers of signature files can be delayed as long as is necessary. In one embodiment, individual MCDs 101 are capable of spooling (temporarily storing) some quantity of signature data so as to account for temporary inability to transmit to server(s) 107. If a prolonged period of time takes place when data cannot be transferred, so that an MCD 101 cannot spool additional incoming data, MCD 101 can temporarily stop collecting data. Alternatively, MCD 101 can discard old data in favor of new data. In one embodiment, once data has been transferred to server 107, MCD 101 clears its local storage (spool) in order to make room for new data.

In one embodiment, MCD 101 does not perform any transfers of target media items when its battery power is less than some threshold amount such as 50%, unless a) it is being charged; or b) its spool space is close to being full. In one embodiment, MCD 101 stops receiving and sampling data from media content sources 102 when its battery power is less than some second threshold amount such as 10%.

In one embodiment, a single data signature stream collection server 107 is used. In another embodiment, a plurality of servers 107 are used, and transmissions of data from MCDs 101 are directed to an appropriate server 107 for receipt, based on current load, geographic location, and/or other factors.

At NOC 106, data signature stream collection server 107 receives data from MCD 101 and stores it in data signature stream store 114 (also referred to as a dynamic database). Correlator server 115 correlates the data signature stream against a set of data signature streams transformed from candidate media sources 113 to determine which candidate media source, if any, the user is listening to at any given time. In one embodiment, correlator server 115 uses a correlation algorithm as described in Avery Li-chun Wang, "An Industrial-Strength Audio Search Algorithm," October 2003, and Avery Li-Chun Wang and Julius O. Smith, III, WIPO publication WO0211123A3, 7 Feb. 2002, "Method for Search in an Audio Database."

In one embodiment, media receivers monitor media sources for broadcast candidate media content items 121 (also referred to as reference media items). Each media receiver 111 can be implemented, for example, as a personal computer (also referred to as a media monitor) with a number of tuner cards that can pick up broadcasts. In one embodiment, each media receiver 111 includes four tuner cards, each capable of receiving AM, FM, or television audio signals. An example of the type of tuner card that can be used for implementing the present invention is the ASI8712 or ASI8713 eight-tuner broadcast adapter available from AudioScience, Inc. of New Castle, Del. In one embodiment, several media receivers 111 are provided, running in different locations so as to be able to pick up different markets/stations, and also to provide improved reliability and redundancy. Media receivers 111 can be configured, for example, to simultaneously receive 32 channels in parallel, taking audio components audio only, and to convert the received audio into digital form via sampling. In one embodiment, media receivers 111 are located in a location that is remote with respect to NOC 106 (for example, in a location suitable for receiving candidate media 121); media receivers 111 then transmit signals to NOC 106 via the Internet or by other means. In another embodiment, media receivers 111 are located at NOC 106.

Transformation server 112 transforms detected candidate media content items 121 to candidate data signature streams, which are then stored at data signature stream store 114 (or at a different stream store, not shown). In one embodiment, only audio is transformed, although one skilled in the art will recognize that the present invention can also be used in connection with video, and that video transforms can thus be applied as well. The transformation converts the raw samples into data files (referred to as signature files or signature streams) that can be compared against other signature files to determine matches.

In addition, in one embodiment, transformation server 112 also transforms candidate media content items from non-broadcast reference media 113 such as audio CDs, video game sound tracks, movie sound tracks, and the like.

In an alternative embodiment, as shown in FIG. 3, individual media receivers 111 transform audio into signature files, and transmit the signature files to server 112A.

In one embodiment, servers 112 (or 112A) and 107 are implemented as a single server for collecting data from both MCDs 101 and media receivers 111. One skilled in the art will recognize that the present invention can be implemented using separate dedicated servers for these two functions, or using a single server that performs both functions.

In one embodiment, raw audio files (for example in .WAV format) are stored in addition to signature files. These can be stored at media receivers 111 or at a storage location associated with server 112 or 112A.

In one embodiment, reference media signature files are broken up into fixed-time increments (such as five-minute increments) for ease of indexing, handling, and comparison. Thus, individual signature files are stored in stream store 114, each signature file representing five minutes of data for one audio channel. In one embodiment where raw audio is stored, the raw audio files are also broken up into fixed-time increments (such as five-minute increments). As an alternative to fixed-time divisions, some other form of intelligent time-based division can be used; for example, blank areas can be detected and interpreted as indicating breaks between commercials, and files can be divided up according to such commercial breaks.

Accordingly, in one embodiment, media receivers 111 transmit data (either in raw form or in signature form) to server 112 or 112A on a periodic basis. Data can be transmitted, for example, in five-minute increments, so that one file is transferred in each transmission. Alternatively, a number of files can be collected at receivers 111 and then transmitted to server 112 or 112A in batch form. In one embodiment, media receivers 111 retain raw audio files for some period of time (such as 3-5 days) and then discard them. In one embodiment, server 112 or 112A retains signature files for some period of time (such as 30 days) and then discards them. By retaining signature files, the present invention enables detection of user exposure to time-shifted media content items. For example, if a user is watching a television show at a time other than the broadcast time (for example, if the show was recorded on a TiVo or other video recording device), the present invention is able to detect such activity and can report that the show was recorded and at what time it was watched.

Candidate media sources can include any type of media that has an audio component detectable by MCD 101. Examples include television (broadcast, cable, satellite, etc.), radio (broadcast, cable and satellite, etc.), recorded music (CD, mp3, etc.), videogame audio, audio track of a DVD and other media sources.

In an alternative embodiment, the present invention can detect user exposure to visual media such as billboards, for example by determining, based on a GPS reading on a user's location, that the user is driving past a billboard. Such media exposure events can be tracked and correlated with purchases in the same manner as exposure to audio media items, as described herein. In one embodiment, such exposure can be tracked along with exposure to audio media items, so as to obtain a complete overview of the effectiveness of an advertising campaign that includes billboard, radio advertisements, and the like.

On a periodic basis (for example, every three hours), server 112 or 112A sends signature data from stream store 114 to correlator server 115 (which may include a single server or any number of servers). In one embodiment, server 115 makes a periodic request for data from server 112 or 112A, and from data signature stream collection server(s) 107. In one embodiment, in response to the request, server 112 or 112A sends signature files representing media items collected by receivers 111, as well as data from MCDs 101 collected by data signature stream collection server(s) 107.

Correlator server 115 identifies user exposure to candidate media items including broadcast items and non-broadcast items. In one embodiment, time stamps stored with the data signatures in stream store 114 aid in the correlation.

In one embodiment, location information is collected by location tracking server 109 and used to assist in the correlation. For example, correlator server 115 can recognize that there is a lower probability of TV viewing while moving. Some behaviors that can be inferred using location information include: driving in a car (using speed range and route tracking against a road map), riding in a bus (using bus routes with frequent stops), visits to retail locations (using coordinates of retail establishments), presence at home, and presence at the workplace. Some locations influence the correlation algorithm. For example, radio and CDs in the database are checked before television if the user is moving; television is checked first while the user is at home.

Additional useful correlations and analyses can also be performed, for example to ascertain particular listening behaviors. For example, purchasing tracking server 117 can collect purchase information from sources 116 for use in assisting correlation server 115. In one embodiment, this is accomplished by tracking the use of a particular credit card that is in the possession of the user.

The present invention is also able to track exposure to entertainment (such as movies), whether such exposure takes place in a movie theater, at home, or elsewhere. Exposure to promotional advertisements can be correlated with exposure to movies and the like. The present invention can also help to determine which promotional channels are most effective in reaching users and which channels are less effective.

For example, in one embodiment, advertisements are given a unique ID. In addition, advertisements are assigned one or more attributes describing the goods or services being advertised at some level of specificity ranging from narrow ("Ford Mustang") to more broad ("Ford") to even more broad ("automobile"). A Ford Mustang advertisement will have all three of these attributes. Attributes may also describe the target audience, such as "professional."

Tallies are kept for each attribute during a sliding window of time, for example 30 days. Purchase information can be acquired from the use of a credit card issued to panel members, through retailer reporting, through survey, or from other sources.

When a user makes a purchase of an item being tracked, related tallies for that user over some period of time (such as the past 30 days) is examined. With a sufficiently large set of users, correlations are made between purchase behavior and media exposure. This is done, for example, by comparing the media exposure of the purchaser of product A with the media exposure of the purchaser of competing product B.

The tracking methods provided by the present invention facilitate measurement of the effectiveness of advertisements in attracting consumers who otherwise would purchase competing brands, as well as attracting consumers who otherwise would not buy the product or product type at all. In addition, the present invention is able to measure the effect an advertisement has on consumption of brands other than the advertised brand.

Using the correlation between purchase behavior and media exposure may show, for example, that people exposed to Ford Mustang commercials have a higher propensity to buy Ford Thunderbirds if they are not exposed to many non-Ford automobile ads.

Given the raw data of purchase behavior and attribute exposure tallies, database queries can be performed to reveal causal relationships and to test advertising hypotheses.

Other sources of data that can be used and stored include an RFID tag, GPS tracking information, and/or a barcode on MCD 101, so as to assist in location tracking. In one embodiment, Bluetooth transceivers can be installed in certain locations, and location tracking is performed by detection of unique Bluetooth transceiver codes.

From these various types of data, patterns can be deduced. For example, the system of the present invention can determine that a user watches news at home and listens to music in the car, or can infer purchasing behavior such as a pattern where the user visits a movie theater after listening to an ad for one of the movies playing at that theater.

In one embodiment, correlator server 115 interacts with additional components, as shown in FIG. 3, to correlate data from MCDs 101 with data from media receivers 111. For example, a series of nodes 303 can be provided for storing signature data. In one embodiment, any number (for example 14) of 4 GB nodes 303 can be provided, each running at a separate computer; alternatively, other arrangements and node sizes can be provided. Slice factory 302 controls the distribution of data from stream store 114 among nodes 303. In one embodiment, a utility server (not shown) controls the operation of slice factory 302.

In one embodiment, nodes 303 run signature matching software 301, such as for example the SongMon function of software provided by Shazam Entertainment Ltd. and described more fully in Wang et al. In another embodiment, this software 301 is located at correlator server 115. Software 301 identifies matches, returning a tag indicating what media content item from media receivers 111 matches a media content item picked up by an MCD 101. Additional information, such as time codes, specifics as to which media receiver 111 and/or channel matched, and the like, can also be returned. Match data is stored, for example in matches database 305 for further analysis and reporting.

In one embodiment, signature matching software 301 runs through candidate data twice. A preliminary run provides quick estimates of matches and can be run on demand. A production run, performed at regular intervals such as once every three hours, provides more accurate matches.

In one embodiment, slice factory 302 and/or utility server (not shown) run signature matching software 301 to aggregate and index signature files from stream store 114 using a hash methodology. From this processed data, a disk image containing indexed signature file data for a particular length of time (such as 18 hours) is formed; this disk image is then stored at each of nodes 303.

In one embodiment, each node 303 contains an identical image with identical data so as to improve throughput by processing data at multiple nodes 303 operating in parallel with one another. In one embodiment, for example, each node 303 processes a maximum of approximately 50 MCDs so as not to become overloaded. Correlator server 115 dispatches MCD files to available nodes 303 based on load and other factors.

In one embodiment, each node processes approximately 18 hours of a large number of channels (for example 70 channels, totaling over 1,000 hours of content) in rolling update fashion. Target media items are compared with these reference media items so as to determine whether the user has been exposed to the media represented by the reference media items.

At periodic intervals (for example, every three hours), the aggregation and indexing is re-run so as to delete the oldest three hours and add the newest three hours, thus maintaining a set amount of data (for example, 18 hours' worth) at all times. In one embodiment, 32 channels of data are stored.

In one embodiment, a binary representation of the reference media signature data is stored in each node 303. Nodes 303 compare the signature data from MCDs 101 against this reference data set. In one embodiment, multiple nodes 303 are utilized to improve matching throughput.

In one embodiment, correlator server(s) 115 sends samples from stream store 114 to an appropriate node 303 based on load and other factors. The present invention is scalable in two dimensions: additional numbers of MCDs 101 can be handled by adding more nodes vertically. Greater amounts of data can be stored by adding more nodes horizontally, or by providing nodes having higher storage capacities.

In one embodiment, data from MCDs 101 includes additional information about the circumstances and conditions of the media exposure, including for example time, day, battery level, telephone number, GPS data, and the like; all of this information can be stored at stream store 114 and used in analysis, matching, and/or reporting.

In one embodiment, certain candidate signatures are stored in static database 304. For example, if an advertiser would like to determine how many users have been exposed to a particular advertisement, a signature for that advertisement is stored in static database 304. The signature need not be collected via media receivers 111, but can be provided by direct input or via correlator servers 115. This stored signature can then be compared with signatures received from MCDs 101. In one embodiment, these candidate signatures are also passed to nodes 303 to facilitate comparison with incoming signatures from MCDs 101. In one embodiment, the content in static database 304 ("static content") is combined with the content collected as described above ("dynamic content") to create the reference data set loaded into each node 303. In another embodiment, static content is processed to generate a reference data set; this reference data set is then loaded into a node 303 that is separate from the dynamic content for analysis of matches against the static content only.

In one embodiment, these candidate signatures are not aged using a sliding window as described above for data collected from media receivers 111. In another embodiment, these candidates are aged but at a different rate than other data.

In yet another embodiment, data in static database 304 can be compared against data from media receivers 111. In this manner, an advertiser can determine whether his or her advertisement ran and was detected by a media receiver 111, regardless of whether it was picked up by an MCD 101.

Referring again to FIG. 1, there are shown additional components that can be used in generating reports on media exposure and consumption. A time-based history of user exposure to media items is stored in consumer tracking database 118. Location information is also stored, if available.

Analytical reporting server 119 uses consumer tracking data from database 118 to generate reports 120. Reports can include, for example:

advertisement play rates;
program ratings;
metrics of marketing effectiveness;
psychographic classifications;
and the like.

In one embodiment, reports are generated using standard relational-database queries. Results of these queries can be place in tabular or graphical format for presentation.

After all correlations are complete, live media source data signatures may be discarded.

Using the above-described techniques, the system of the present invention is able to measure media consumption both in and out of the home.

Alternate Configurations

Figure 2:
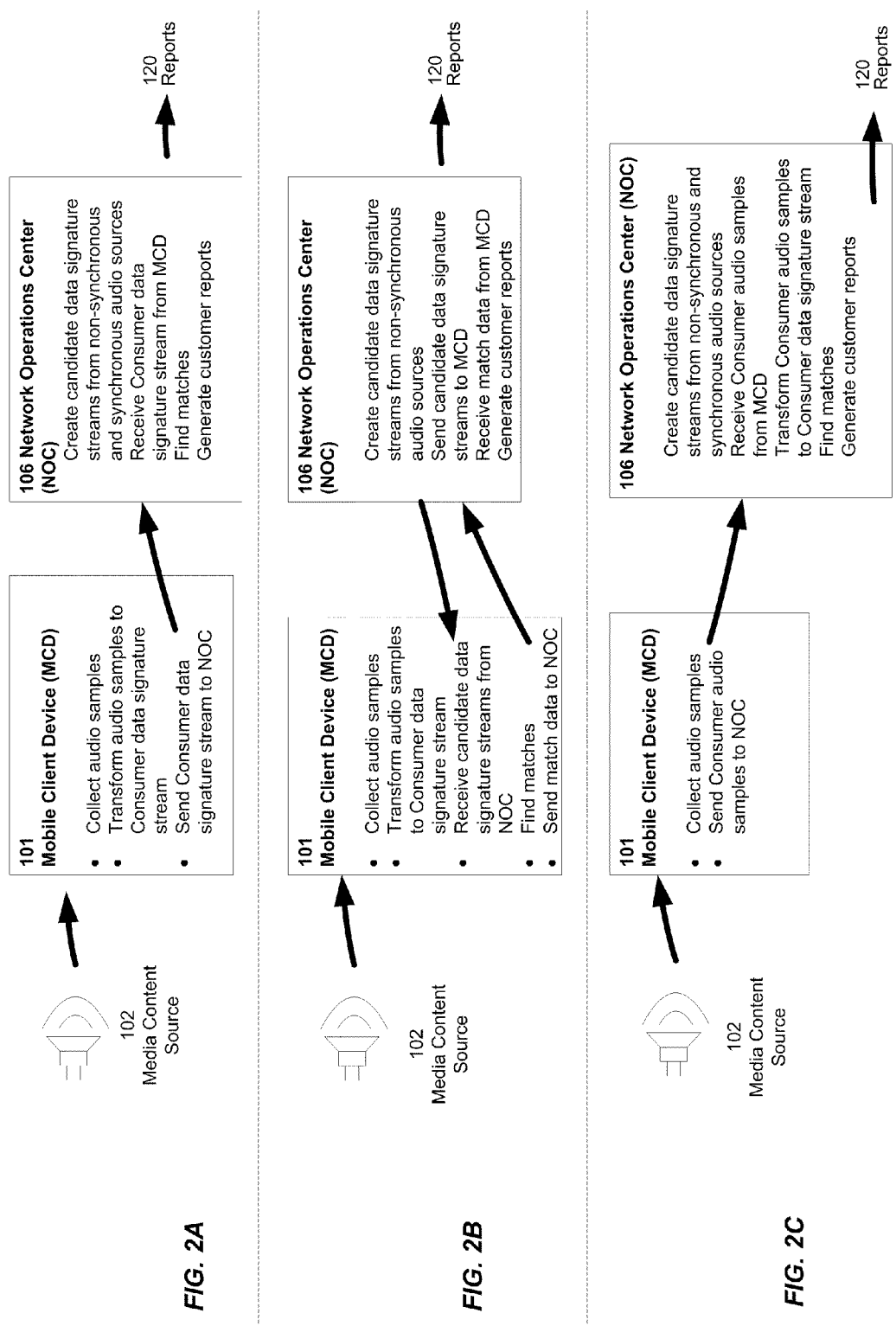
FIGS. 2A through 2C are block diagrams depicting alternative methodologies for practicing the present invention.

One skilled in the art will recognize that the transformation and matching steps can be performed in many different ways and at different components within the overall system. FIGS. 2A through 2C provide examples of different configurations for performing these functions. These Figures also provide a description of the overall method of operation of the present invention according to various embodiments. The term "candidate data signature stream" is equivalent to reference media items; the term "consumer data signature stream" is equivalent to target media items.

Referring now to FIG. 2A, there is shown a configuration where transformation takes place at MCD 101 and matching takes place at NOC 106. As described above, MCD 101 collects audio samples, transforms them to a signature stream, and transmits the signature stream to NOC 106. NOC 106 identifies matches between signature stream received from MCD 101 and candidate streams derived from candidate media 113 and 121. Although FIG. 2A depicts the candidate data signature data stream being created at NOC 106; however, one skilled in the art will recognize that the candidate signature data stream can instead be generated at media receivers 111 and/or provided directly to NOC 106 from some other source.

Referring now to FIG. 2B, there is shown a configuration where transformation and matching both take place at MCD 101. Here, MCD 101 collects audio samples and transforms them to a signature stream. NOC 106 generates candidate data signature streams from candidate media, and transmits these candidate streams to MCD 101. Alternatively, the candidate signature data stream can instead be generated at media receivers 111 and/or provided to NOC 106 from some other source; NOC 106 then sends them to MCD 101. MCD 101 then identifies matches between the signature stream generated from incoming audio data and the candidate data signature streams received from NOC 106. MCD 101 then sends match data to NOC 106. This configuration is particularly useful when the number of candidate audio sources is relatively small and known in advance. For example, such a configuration can be used for monitoring a user's exposure to a limited and expected set of advertisements. In such a situation, this configuration reduces the amount of data that is continually transmitted from MCD 101 to NOC 106; once the set of candidates is provided to MCD 101, only match data need be transmitted, which typically requires less bandwidth than transmission of signatures from MCD 101 to NOC 106. Such a configuration is also a more distributed processing paradigm that can serve to reduce processor load at NOC 106, since NOC 106 need not perform matching operations for a large number of MCDs; rather MCD 101s do their own matching.

Referring now to FIG. 2C, there is shown a configuration where transformation and matching both take place at NOC 106. Here, MCD 101 collects audio samples and transmits the raw data to NOC 106. NOC 106 transforms the raw data to a signature stream; alternatively, the candidate signature data stream can instead be generated at media receivers 111 and/or provided directly to NOC 106 from some other source. NOC 106 then identifies matches between the signature stream and the candidate data signature streams. This configuration reduces the processing load on MCD 101.

In any of these configurations, NOC 106 can optionally inform MCD 101 to only sample audio at specific time periods. In this way, MCD 101 sample period may be limited to commercial time periods, or other periods of interest.

In an alternative embodiment, MCD 101 stores feature-extracted samples. When MCD 101 detects (hears) an advertisement or other sought-for audio, it reports back to NOC 106 that it heard the item. In one variation of this embodiment, MCD 101 does not need to transmit any transformed audio back to NOC 106, but simply reports and identifies the item that was heard. In another variation of this embodiment, MCD 101 transmits additional information about the detected audio, such as time and place where it was detected. In yet another variation, MCD 101 transmits the transformed audio (or some subset of it) to NOC 106, so that additional information can be derived from the detected audio.

In another alternative embodiment, the invention operates at a variable sample rate depending on the amount of usage that is detected. A default, lower sample rate is used when the usage pattern is continuous and/or relatively stable. A higher sample rate is used when changes in usage pattern are detected. In one variation of this embodiment, MCD 101 switches automatically between these rates in response to changing conditions. Any number of different sample rates, or continuous variation within a defined range, can be used.

Data Signature Algorithm

In one embodiment, the present invention performs audio data signature transformation according to any of a number of well-known algorithms. Preferably, an algorithm is used that meets the processing power, memory size, battery life, and bandwidth constraints of MCD 101, and also meets a minimum accuracy requirement. The audio data signature transformation algorithm finds matching audio streams in broadcast audio signals, known to be transmitted at a certain time, and asynchronous audio signals such as music tracks and video game sound tracks.

The algorithm can be based in the time-domain, based in the frequency-domain, or based in a hybrid of the two.

In one embodiment, the audio data signature transformation algorithm correlates a consumer data signature stream (target media items) against a potentially large number of candidate data signature streams (reference media items). Once a match is found, it can be presumed the match continues for some period of time. In one embodiment, only the candidate data signature stream is correlated against until there is no longer a match. In other words, when a match is found, it is "locked on to" and no other candidate data signature streams are considered until the match fails.

In one embodiment, the system of the present invention uses a signature transformation algorithm as described in Avery Li-chun Wang, "An Industrial-Strength Audio Search Algorithm," October 2003, and Avery Li-Chun Wang and Julius O. Smith, III, WIPO publication WO0211123A3, 7 Feb. 2002, "Method for Search in an Audio Database."

In one embodiment, the parameters of the audio acquisition (sampling rate, sampling duty cycle, quiescent time between sampling periods, volume, filter parameters, and the like), and even the algorithm in use, can be adjusted dynamically by MCD 101 and/or by NOC 106. These adjustments may be a function of location information downloaded to MCD 101 from NOC 106 in advance or in near real-time based on current location. These adjustments are performed, for example, to increase matching accuracy, minimize data transmission, minimize MCD 101 battery drain, and for other system performance optimizations. For example, if uploading of data signatures can be carried out close to real-time, and NOC 106 has "locked on" to a matching signal, MCD 101 may be instructed to lower its sampling duty cycle or to suspend sampling for some period of time.

The audio sampling can be continuous or periodic; in one embodiment, 10 seconds are sampled every 30 seconds.

Location Information

In one embodiment, location of MCD 101 is determined by built-in or added-in GPS, by triangulation with wireless data provider transceiver sites, by closest tower identification, by wireless data network registration (Bluetooth, WiFi/802.11), or by other means. Location data can be analyzed and compared with location databases to determine entry into a store or other location, time spent in the location, speed of travel, presence at a public venue (movie theater, concert hall, stadium), and other attributes that may be of commercial value when combined with media consumption. For example, in one embodiment, location information is used to detect when a user takes a car for a test drive by tracking the entry into a car dealership, an average wait time, and a circuit of automobile-speed motion ending back at the dealership.

Purchase Tracking Credit Card

In one embodiment, the present invention provides a mechanism for correlating exposure to media items with purchases. Users are given credit cards to be used for making purchases. Purchase behavior, at least to the resolution of store and amount, is available from the partner affinity card issuer. Other methods for collecting this data may include use of an RFID tag and/or a barcode on MCD 101. For example, many merchants, most notably grocery stores with affinity cards, store detailed purchase history information about their customers. The media measurement system can access this data in order to provide purchase information to the system of the present invention. In one embodiment, a bar code or other identifying indicia can be provided on MCD 101 itself, so that the user can simply hand the device to the grocery store clerk for "swiping"; alternatively, MCD 101 can be detected via RFID or other mechanisms, and the code detected thereby can be linked to the user's affinity program record.

User Compliance

In one embodiment, MCD 101 includes sensors to help determine if it is in the possession of a person. Sensors may include: vibration, state of the Hosting Device (on/off, usage, key presses, etc.), temperature (to detect whether MCD 101 is being carried, since it will be proximate to or in contact with the person's body), and others. Information from these sensors is processed to assist in determining whether a user is carrying MCD 101 as needed for accurate results. If data is received at a time period when evidence indicates the device is not being carried, the received data may be discarded or treated as having a lower degree of reliability, or it may be otherwise flagged.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and analysis and processing techniques and mechanisms may be used, that the present invention can be implemented using mechanisms other than those described above.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer-implemented method for detecting user exposure to media items, comprising:
   at an electronic device, receiving a plurality of reference media items from at least one media source;
   at the electronic device, receiving a representation of at least one target media item from at least one electronic client device, wherein receiving a representation of at least one target media item from at least one client device is performed by at least one electronic data signature stream collection server;
   at the electronic device, identifying one of the reference media items as corresponding to the target media item; and
   at an output device, generating output signaling user exposure to the identified reference media item.

2. The computer-implemented method of claim 1, wherein each electronic client device comprises an electronic mobile client device.

3. The computer-implemented method of claim 1, wherein each electronic mobile client device is carried by a user.

4. The computer-implemented method of claim 1, wherein each electronic mobile client device comprises one selected from the group consisting of:
   a mobile telephone;
   a personal digital assistant;
   a handheld computer;
   a laptop computer;
   a wristwatch;
   a portable game player; and
   a portable music player.

5. The computer-implemented method of claim 1, wherein each reference media item comprises audio content, and the target media item comprises audio content.

6. The computer-implemented method of claim 1, further comprising:
   at the electronic device, generating a signature representing each reference media item; and
   at the electronic device, generating a signature representing each target media item;
   and wherein identifying one of the reference media items as corresponding to the target media item comprises detecting, at the electronic device, a match between a reference media item signature and a target media item signature.

7. The computer-implemented method of claim 6, wherein:
   generating a signature representing each reference media item is performed at an electronic media receiver associated with a network operations center;
   generating a signature representing each target media item is performed at an electronic component of the network operations center; and
   identifying one of the reference media items is performed at an electronic component of the network operations center.

8. The computer-implemented method of claim 1, wherein each received representation of a target media item comprises a signature representing the target media item, the method further comprising:
   at the electronic device, generating a signature representing each reference media item; and
   wherein identifying one of the reference media items as corresponding to the target media item comprises detecting, at the electronic device, a match between a reference media item signature and a target media item signature.

9. The computer-implemented method of claim 8, wherein:
   each signature representing a target media item is generated at an electronic client device;
   generating a signature representing each reference media item is performed at an electronic media receiver associated with a network operations center; and
   identifying one of the reference media items as corresponding to the target media item is performed at an electronic component of a network operations center.

10. The computer-implemented method of claim 1, wherein each received representation of a target media item comprises a signature representing the target media item, and wherein each received representation of a reference media item comprises a signature representing the reference media item; and
    wherein identifying one of the reference media items as corresponding to the target media item comprises detecting, at the electronic device, a match between a reference media item signature and a target media item signature.

11. The computer-implemented method of claim 1, wherein each received representation of a reference media item comprises a signature representing the reference media item, the method further comprising:
    at the electronic device, generating a signature representing each target media item; and
    wherein identifying one of the reference media items as corresponding to the target media item comprises detecting, at the electronic device, a match between a reference media item signature and a target media item signature.

12. The computer-implemented method of claim 11, wherein:
    each signature representing a reference media item is generated at an electronic media receiver associated with a network operations center; generating a signature representing each target media item is performed at an electronic client device; and
    identifying one of the reference media items as corresponding to the target media item is performed at an electronic client device.

13. The computer-implemented method of claim 12, further comprising:
    transmitting, from the electronic client device to the network operations center, an indication of at least one match between a reference media item and a target media item.

14. The computer-implemented method of claim 1, wherein each reference media item comprises a sample of received reference media.

15. The computer-implemented method of claim 1, wherein each target media item comprises a sample of received target media.

16. The computer-implemented method of claim 1, wherein receiving a plurality of reference media items comprises:
    at the electronic device, receiving a reference media stream and sampling the reference media stream.

17. The computer-implemented method of claim 1, wherein receiving a plurality of reference media items comprises:
   at the electronic device, receiving a reference media stream and dividing the reference media stream into a plurality of files.

18. The computer-implemented method of claim 1, wherein receiving a representation of at least one target media item comprises:
   at the electronic device, receiving a target media stream and sampling the target media stream.

19. The computer-implemented method of claim 1, wherein receiving a representation of at least one target media item comprises:
   at the electronic device, receiving a target media stream and dividing the target media stream into a plurality of files.

20. The computer-implemented method of claim 1, wherein the electronic client device comprises a microphone having a use other than recording target media items, and wherein the electronic client device receives the at least one target media item via the microphone.

21. The computer-implemented method of claim 1, further comprising detecting a location for the electronic client device, and wherein identifying one of the reference media items as corresponding to the target media item comprises:
   at the electronic device, correlating the detected location with a location of at least one geographically identifiable sponsor of a reference media item.

22. The computer-implemented method of claim 21, wherein detecting a location for the client device comprises, at the electronic device, detecting the location via at least one selected from the group consisting of:
   GPS tracking;
   RFID tracking;
   Bluetooth tracking.

23. The computer-implemented method of claim 1, wherein receiving a plurality of reference media items comprises receiving, at the electronic device, at least one broadcast.

24. The computer-implemented method of claim 1, wherein receiving a plurality of reference media items comprises receiving, at the electronic device, at least one media item read from a fixed medium.

25. The computer-implemented method of claim 1, wherein receiving a plurality of reference media items comprises receiving, at the electronic device, at least one media item from a non-broadcast source.

26. The computer-implemented method of claim 1, wherein receiving a plurality of reference media items comprises receiving, at the electronic device, at least one broadcast, and wherein the representation of at least one target media item indicates user exposure at a time other than the time of the broadcast.

27. The computer-implemented method of claim 1, wherein generating output signaling user exposure to the identified reference media item comprises:
   at the output device, generating a report.

28. The computer-implemented method of claim 1, further comprising receiving, at the electronic device, consumer purchasing information, and wherein generating output signaling user exposure to the identified reference media item comprises generating a report at the output device correlating user purchasing info with user exposure to the identified reference media item.

29. The computer-implemented method of claim 28, wherein receiving consumer purchasing information comprises receiving, at the electronic device, at least one indication of user use of a credit card.

30. The computer-implemented method of claim 1, wherein receiving a plurality of reference media items is performed by at least one electronic media receiver.

31. The computer-implemented method of claim 1, wherein receiving a representation of at least one target media item from at least one client device comprises:
   at the electronic device, selecting, based on at least one of load and geographic proximity to the client device, one of a plurality of electronic data signature stream collection servers; and
   receiving the representation of at least one target media item at the selected electronic data signature stream collection server.

32. The computer-implemented method of claim 1, wherein the target media item comprises an advertisement.

33. The computer-implemented method of claim 1, wherein at least one electronic client device is positioned to detect audio from a media play device.

34. A computer-implemented method for detecting broadcast of a target media item, comprising:
   at an electronic device, receiving a plurality of reference media items from at least one broadcast media source;
   at the electronic device, receiving a representation of a target media item, wherein receiving the representation of at least one target media item is performed by at least one electronic data signature stream collection server;
   at the electronic device, identifying one of the reference media items as corresponding to the target media item; and
   at an output device, generating output signaling that the target media item has been broadcast.

35. A system for detecting user exposure to media items, comprising:
   a server, for receiving a plurality of reference media items from at least one media receiver;
   at least one stream collection server, for receiving a representation of at least one target media item from at least one client device;
   a stream store, coupled to the server and to the at least one stream collection server, for storing a representation of at least a subset of the received reference media items and for storing a representation of the at least one target media item;
   a correlator server, coupled to the stream store, for identifying one of the reference media items as corresponding to the target media item; and
   an output device, coupled to the correlator server, for generating output signaling user exposure to the identified reference media item.

36. The system of claim 35, wherein each client device comprises a mobile client device.

37. The system of claim 35, wherein each mobile client device is carried by a user.

38. The system of claim 35, wherein each mobile client device comprises one selected from the group consisting of:
   a mobile telephone;
   a personal digital assistant;
   a handheld computer;
   a laptop computer;
   a wristwatch;
   a portable game player; and
   a portable music player.

39. The system of claim 35, wherein each reference media item comprises audio content, and the target media item comprises audio content.

40. The system of claim 35, further comprising: a transformation server, for generating a signature representing each reference media item and for generating a signature representing each target media item; and wherein the correlator server identifies one of the reference media items as corresponding to the target media item by detecting a match between a reference media item signature and a target media item signature.

41. The system of claim 40, wherein the transformation server and the correlator server are located at a network operations center.

42. The system of claim 35, wherein each received representation of a target media item comprises a signature representing the target media item, the system further comprising:
a transformation server, for generating a signature representing each reference media item;
and wherein the correlator server identifies one of the reference media items as corresponding to the target media item by detecting a match between a reference media item signature and a target media item signature.

43. The system of claim 42, wherein:
each signature representing a target media item is generated at a client device; and
wherein the transformation server and the correlator server are located at a network operations center.

44. The system of claim 35, wherein each received representation of a target media item comprises a signature representing the target media item, and wherein each received representation of a reference media item comprises a signature representing the reference media item; and
wherein the correlator server identifies one of the reference media items as corresponding to the target media item by detecting a match between a reference media item signature and a target media item signature.

45. The system of claim 35, wherein each received representation of a reference media item comprises a signature representing the reference media item, the system further comprising:
a transformation mechanism, for generating a signature representing each target media item; and
wherein the correlator server identifies one of the reference media items as corresponding to the target media item by detecting a match between a reference media item signature and a target media item signature.

46. The system of claim 35, wherein each reference media item comprises a sample of received reference media.

47. The system of claim 35, wherein each target media item comprises a sample of received target media.

48. The system of claim 35, wherein the server receives a reference media stream and samples the reference media stream.

49. The system of claim 35, wherein the server receives a reference media stream and divides the reference media stream into a plurality of files.

50. The system of claim 35, wherein the stream collection server receives a target media stream and samples the target media stream.

51. The system of claim 35, wherein the stream collection server receives a target media stream and divides the target media stream into a plurality of files.

52. The system of claim 35, wherein each client device comprises a microphone having a use other than recording target media items, and wherein the client device receives the at least one target media item via the microphone.

53. The system of claim 35, wherein the plurality of reference media items comprises at least one broadcast.

54. The system of claim 35, wherein the plurality of reference media items comprises at least one media item read from a fixed medium.

55. The system of claim 35, wherein the plurality of reference media items comprises at least one media item from a non-broadcast source.

56. The system of claim 35, wherein the output device generates a report signaling user exposure to the identified reference media item.

57. The system of claim 35, wherein the target media item comprises an advertisement.

58. The system of claim 35, wherein at least one client device is positioned to detect audio from a media play device.

59. A system for detecting broadcast of a target media item, comprising:
a server, for receiving a plurality of reference media items from at least one broadcast media source;
at least one stream collection server, for receiving a representation of a target media item;
a correlator server, for identifying one of the reference media items as corresponding to the target media item; and an output device, coupled to the correlator server, for generating output signaling that the target media item has been broadcast.

60. A system for detecting user exposure to media items, comprising:
a server, for receiving a plurality of reference media items from at least one media receiver;
a transformation server, for generating a signature for each received reference media item, the transformation server being located at a network operations center;
a client device interface, for transmitting at least a subset of the generated signatures to at least one client device and for receiving from a client device an indication as to whether any target media items match any generated signature; and
an output device, coupled to the client device interface, for generating output signaling user exposure to the identified reference media item.

61. A computer-implemented method for detecting user exposure to media items, comprising:
at an electronic device, receiving a plurality of reference media items from at least one media source;
at the electronic device, receiving, from at least one electronic client device:
a representation of at least one target media item; and
an indication as to whether the electronic client device is in the physical possession of a person at a time of exposure to the target media item; and
responsive to an indication that the electronic client device is in the physical possession of a person at the time of exposure to the target media item:
at the electronic device, identifying one of the reference media items as corresponding to the target media item; and
at an output device, generating output signaling user exposure to the identified reference media item.

62. The computer-implemented method of claim 61, further comprising:
responsive to an indication that the client device is not in the physical possession of a person at the time of exposure to the target media item, ignoring the representation of the at least one target media item from the client device.

63. The computer-implemented method of claim 61, further comprising:
responsive to an indication that the client device is not in the physical possession of a person at the time of exposure to the target media item:
at an electronic device, identifying one of the reference media items as corresponding to the target media item; and
at the output device, generating output signaling user exposure to the identified reference media item, wherein the output is flagged as having reduced reliability.

64. The computer-implemented method of claim 61, wherein the indication as to whether the client device is in the physical possession of a person is provided based on output of at least one sensor associated with the client device.

65. The computer-implemented method of claim 64, wherein the at least one sensor detects at least one selected from the group consisting of:
vibration of the client device;
key presses on the client device;
temperature of the client device; and
movement of the client device.

66. A client device for detecting user exposure to media items, comprising:
an audio input device, for detecting a media item by receiving auditory input from a media source;
a sensor, for detecting whether the client device is in the physical possession of a person at the time of detection of the media item; and
a transmitter, for, responsive to the sensor indicating that the transmitter client device is in the physical possession of a person at the time of detection of the media item, transmitting a representation of the detected media item.

67. The client device of claim 66, wherein the sensor comprises at least one selected from the group consisting of:
a vibration sensor, for detecting vibration of the client device;
at least one button, for detecting key presses on the client device;
a thermometer, for detecting temperature of the client device; and
a movement sensor, for detecting movement of the client device.

68. A client device for detecting user exposure to media items, comprising:
an audio input device, for detecting a media item by receiving auditory input from a media source;
a sensor, for detecting whether the client device is in the physical possession of a person at the time of detection of the media item; and
a transmitter, for transmitting a representation of the detected media item, and for transmitting an indication as to whether the client device is in the physical possession of a person at the time of detection of the media item.

69. The client device of claim 68, wherein the sensor comprises at least one selected from the group consisting of:
a vibration sensor, for detecting vibration of the client device;
at least one button, for detecting key presses on the client device;
a thermometer, for detecting temperature of the client device; and
a movement sensor, for detecting movement of the client device.

* * * * *